United States Patent
Li

(10) Patent No.: US 12,057,999 B2
(45) Date of Patent: Aug. 6, 2024

(54) VIRTUAL NETWORK PERFORMANCE ACCELERATION METHOD, APPARATUS AND DEVICE, AND STORAGE MEDIUM

(71) Applicant: INSPUR SUZHOU INTELLIGENT TECHNOLOGY CO., LTD., Suzhou (CN)

(72) Inventor: Fengqi Li, Suzhou (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/279,159

(22) PCT Filed: Jan. 26, 2022

(86) PCT No.: PCT/CN2022/074069
§ 371 (c)(1),
(2) Date: Aug. 28, 2023

(87) PCT Pub. No.: WO2023/050663
PCT Pub. Date: Apr. 6, 2023

(65) Prior Publication Data
US 2024/0089171 A1    Mar. 14, 2024

(30) Foreign Application Priority Data
Sep. 29, 2021 (CN) .......................... 202111147642.0

(51) Int. Cl.
*H04L 49/00* (2022.01)
*H04L 41/0816* (2022.01)
*H04L 41/0895* (2022.01)

(52) U.S. Cl.
CPC ...... *H04L 41/0816* (2013.01); *H04L 41/0895* (2022.05); *H04L 49/70* (2013.01)

(58) Field of Classification Search
CPC .. H04L 41/0816; H04L 41/0895; H04L 49/70
See application file for complete search history.

(56) References Cited

U.S. PATENT DOCUMENTS 7,818,729 B1    10/2010  Plum et al.
2017/0371692 A1  12/2017  Connolly
(Continued)

FOREIGN PATENT DOCUMENTS

CN    107872545 A    4/2018
CN    108234359 A    6/2018
(Continued)

OTHER PUBLICATIONS

International Search Report dated May 19, 2022; Application No. PCT/CN2022/074069.
(Continued)

*Primary Examiner* — Hitesh Patel
*Assistant Examiner* — Sujana Khakural
(74) *Attorney, Agent, or Firm* — DINSMORE & SHOHL LLP

(57) ABSTRACT

The virtual network performance acceleration method includes step S1, monitoring whether an OVS invokes a CT mechanism; step S2, if it is detected that the OVS invokes a CT mechanism, triggering a translation rule; and step S3, forwarding a translation message translated by the translation rule. A virtual network performance acceleration apparatus and a storage medium are also disclosed.

9 Claims, 4 Drawing Sheets

(56) References Cited

U.S. PATENT DOCUMENTS

| | | | |
|---|---|---|---|
| 2019/0089641 A1 | 3/2019 | Shattah | |
| 2019/0149516 A1* | 5/2019 | Rajahalme | H04L 63/0254 370/392 |
| 2019/0149518 A1 | 5/2019 | Sevinc | |
| 2022/0131792 A1* | 4/2022 | Wang | H04L 45/745 |

FOREIGN PATENT DOCUMENTS

| | | |
|---|---|---|
| CN | 109962832 A | 7/2019 |
| CN | 110391993 A | 10/2019 |
| CN | 110636036 A | 12/2019 |
| CN | 110708393 A | 1/2020 |
| CN | 113595938 A | 11/2021 |

OTHER PUBLICATIONS

Written Opinion dated May 19, 2022; International Application PCT/CN2022/074069.

1st Office Action of corresponding Chinese application Sep. 29, 2021; Application No. 2021111476420.

\* cited by examiner

VIRTUAL NETWORK PERFORMANCE ACCELERATION METHOD, APPARATUS AND DEVICE, AND STORAGE MEDIUM

CROSS-REFERENCE TO RELATED APPLICATIONS

This application is the U.S. National Stage of PCT/CN2022/074069 filed on Jan. 26, 2022, which claims priority to Chinese Patent Application 202111147642.0 filed on Sep. 29, 2021, the entire content of both are incorporated herein by reference in their entirety.

TECHNICAL FIELD

The present application relates to the technical field of communications, in particular to a virtual network performance acceleration method, apparatus and device, and a storage medium.

BACKGROUND

After continuous development and improvement, cloud computing has become a current mainstream. A traditional form that business is deployed by a bare machine is almost impossible to find in a data center, instead, the business is operated in a form of a virtual machine or a container, after continuous development of virtualization and containerization, traditional hardware resources exclusively owned by the bare machine need to be shared by dozens or hundreds of virtual machines (VMs) or containers, leading to a surge in a utilization rate of the hardware resources in the data center, and business density carried by unit hardware resources is becoming higher and higher, which poses higher challenges and requirements for how to improve the use performance of the unit hardware resources. For network hardware, how to efficiently use fixed network hardware resources to provide users with services with highest quality is an urgent problem that the data center needs to solve.

The vast majority of virtual networks in current data centers use virtual switch software (OVS) to implement traditional network functions, such as switching and routing, that need to be completed by hardware, and the OVS will invoke a connect and track (CT) module of a kernel of a Linux system when processing stateful traffic. The CT module of the kernel is designed for universal packet processing flows, and its internal states and flows are long and complex, resulting in significant performance losses. Improving the network performance of an OVS virtual network without upgrading hardware has become a focus and difficulty in the technical field of communications.

Therefore, there is an urgent need to propose a method, apparatus and device that can bypass the CT module to accelerate the virtual network performance based on the OVS and a storage medium.

SUMMARY

A specific technical solution provided by embodiments of the present application is as follows.

A virtual network performance acceleration method includes: step S1, monitoring whether an OVS invokes a CT mechanism; step S2, triggering a translation rule in a case of detecting that the OVS invokes the CT mechanism; and step S3, forwarding a translation message translated by the translation rule. The translation rule includes: obtaining header information of a first message that has been processed by the CT mechanism, a universal unique identifier and header information of a second message that needs to be processed by the CT mechanism; and translating the header information of the second message based on the header information of the first message and the universal unique identifier.

Further, translation of the header information of the second message includes: generating an information correspondence table based on the header information of the first message and the universal unique identifier; determining a data structure corresponding to the universal unique identifier according to the information correspondence table; and generating, based on the data structure, the translation message by replacing the header information of the second message.

Further, the step of generating the information correspondence table includes: obtaining the header information of the first message that has been processed by the CT mechanism; storing the header information of the first message in a form of a data structure, and determining the universal unique identifier corresponding to each data structure; and generating the information correspondence table based on the data structure and the corresponding universal unique identifier.

Further, the header information at least includes: a network address translation type, an IP address, port information and a link type, and replacement of the header information of the second message depends on a network translation type in the header information of the second message.

Further, the method includes: step S0, judging whether to turn on virtual network performance acceleration, and executing step S1 in a case of confirming that the virtual network performance acceleration is turned on; not executing step S1 in a case of confirming that the virtual network performance acceleration is not turned on; and step S2 further includes: not triggering the translation rule in a case of not detecting that the OVS invokes the CT mechanism.

Further, the header information of the second message after being replaced is stored in a form of a second data structure; and the information correspondence table is updated based on the second data structure and a corresponding universal unique identifier thereof.

Further, updating the information correspondence table includes: traversing the information correspondence table, and recognizing a coincidence degree between the header information of the second message and the header information of each first message; and storing, in a case that the coincidence degree between the header information of the second message and the header information of any first message is lower than a first threshold, the second data structure and the corresponding universal unique identifier thereof into the information correspondence table to update the information correspondence table.

A virtual network performance acceleration apparatus includes: a control module, configured to turn on or turn off an acceleration function of the virtual network performance acceleration apparatus; a monitoring module, configured to monitor whether an OVS invokes a CT mechanism; a translating module, configured to carry out translation of header information by obtaining header information of a first message that has been processed by the CT mechanism, a universal unique identifier and header information of a second message that needs to be processed by the CT mechanism; generating an information correspondence table based on the header information of the first message and the universal unique identifier; determining a data structure corresponding to the universal unique identifier according to the information correspondence table; and generating, based on the data structure, a translation message by replacing the header information of the second message; and a kernel, configured to receive the translation message and forward the translation message.

An embodiment of the present application further provides a virtual network performance acceleration device, including a memory and one or more processors, wherein the memory has computer readable instructions stored therein, and the computer readable instructions, when executed by the one or more processors, enables the one or more processors to execute steps of any above virtual network performance acceleration method.

An embodiment of the present application finally further provides one or more nonvolatile computer readable storage media having computer readable instructions stored therein, wherein the computer readable instructions, when executed by one or more processors, enable the one or more processors to execute steps of any above virtual network performance acceleration method.

Details of one or more embodiments of the present application are presented in drawings and descriptions below. Other features and advantages of the present application will become clear from the specification, drawings and claims.

BRIEF DESCRIPTION OF THE DRAWINGS

In order to explain technical solutions in embodiments of the present application more clearly, the following will briefly introduce the drawings that need to be used in the description of the embodiments. Apparently, the drawings in the following description are only some embodiments of the present application, and for those of ordinary skill in the art, on the premise of no creative labor, other drawings can be obtained from these drawings.

DETAILED DESCRIPTION

In order to make objectives, technical solutions and advantages of the present application clearer, the technical solutions in embodiments of the present application will be clearly and completely described in the following with reference to drawings in the embodiments of the present application. Apparently, the described embodiments are only some rather than all of the embodiments of the present application. Based on the embodiments in the present application, all other embodiments obtained by those of ordinary skill in the art without creative efforts shall fall within the protection scope of the present application.

Embodiment 1

Figure 1:
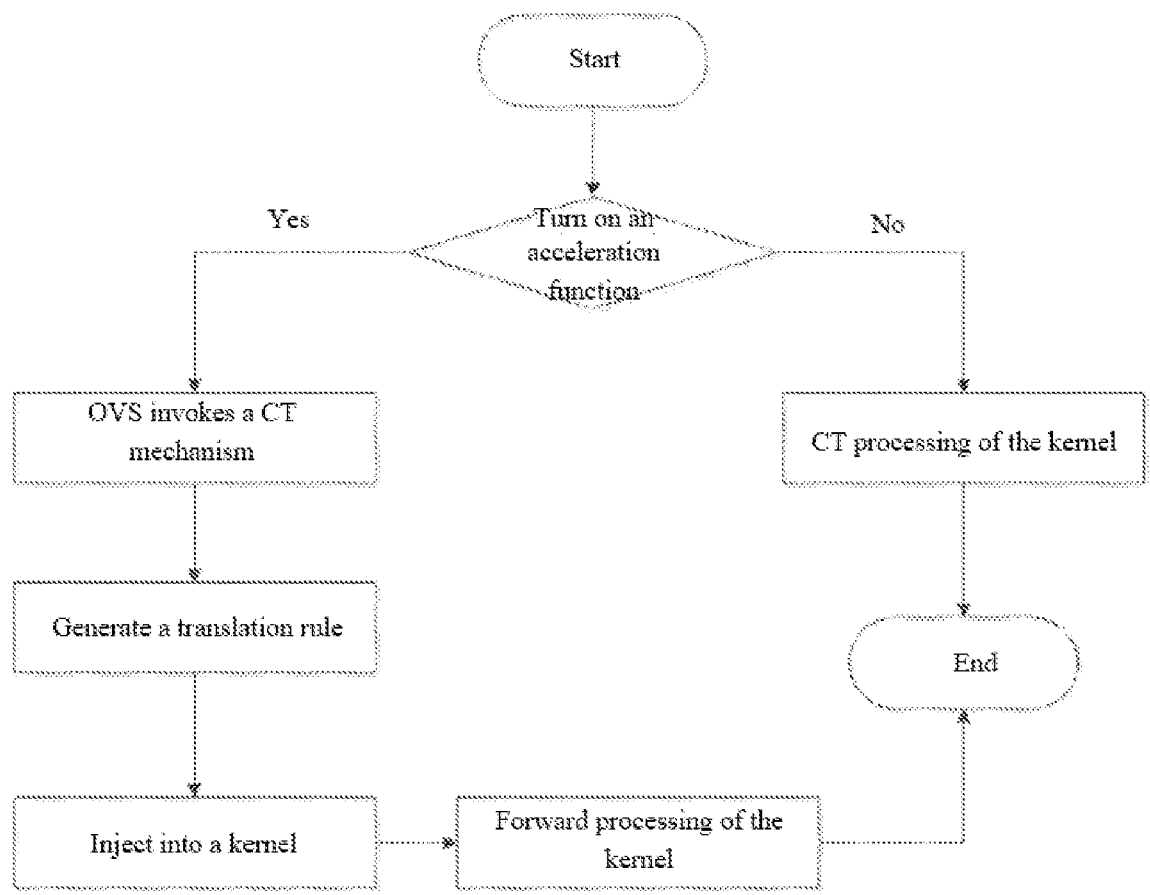
FIG. 1 shows a schematic flow chart of a virtual network performance acceleration method described in one or more embodiments of the present application.

The present application provides a virtual network performance acceleration method, as shown in FIG. 1, a user can choose whether to turn on virtual network performance acceleration based on their own needs.

Specifically, a step of monitoring whether an OVS invokes a CT mechanism is executed in a case of determining whether to turn on the virtual network performance acceleration and confirming that the virtual network performance acceleration is turned on. The step of monitoring whether the OVS invokes the CT mechanism is not executed in a case of determining whether to turn on the virtual network performance acceleration and confirming that the virtual network performance acceleration is not turned on.

If the network performance acceleration is not turned on, a message forwarding operation is performed according to original internal function module design of a Linux kernel, and the Linux kernel includes function modules such as CT, data packet filtering, network address translation (NAT), transparent proxy, packet speed restriction and data packet modification.

Figure 2:
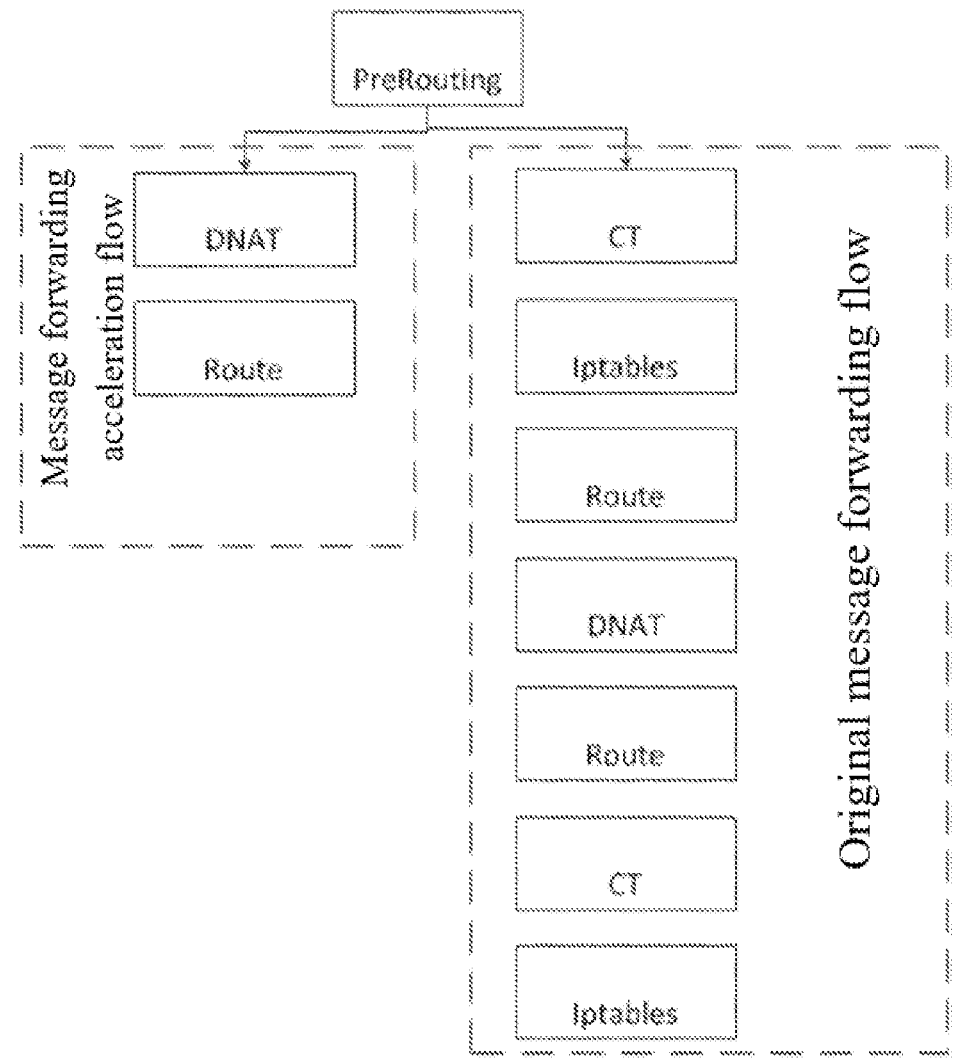
FIG. 2 shows a comparison diagram of a message forwarding flow in the prior art and a message forwarding acceleration flow described in one or more embodiments of the present application.

If the network performance acceleration is turned on, the following steps are executed: step 1, whether the OVS invokes the CT mechanism is monitored and judged, that is, whether the OVS invokes the CT mechanism is judged, and then step S2 is executed. Step S2, a translation rule is triggered in a case of detecting that the OVS invokes the CT mechanism, that is, the translation rule is triggered in a case of determining that it is monitored that the OVS invokes the CT mechanism. If it is judged that it is determined that the OVS invokes the CT mechanism, step S3 is executed, and if it is monitored that the OVS does not invoke the CT mechanism, messages are processed according to original message processing flows when the CT mechanism is not invoked, such as data packet filtering, network address translation (NAT), transparent proxy, packet speed restriction, data packet modification and other processing flows. That is to say, if it is determined that it is monitored that the OVS does not invoke the CT mechanism, the messages are processed according to the original message processing flows when the CT mechanism is not invoked. Step S3, a translation message translated by the translation rule is forwarded; and the generated translation message is injected into the Linux kernel again, and the Linux kernel executes subsequent stream table matching and forwarding operations. It should be noted that the virtual network performance acceleration method is applicable to a processing process of request messages, as well as a processing process of response messages. Ultimately, on the basis of reducing an original processing logic, technical effects that are consistent with original message processing functions when the CT mechanism is invoked are achieved, finally high-speed processing of the messages is realized, and forwarding performance of the messages is improved. A processing flow comparison diagram between original message processing flows when the CT mechanism is invoked and message processing flows using the virtual network performance acceleration method described in the present application is as shown in FIG. 2, through the comparison diagram, it can be clearly seen that for the message processing flows of the virtual network performance acceleration method, compared with the message processing flows not using the virtual network performance acceleration method described in the present application, the processing logic is greatly reduced, and the forwarding performance of the messages is greatly improved.

It should be understood that although the steps in the flow chart of FIG. 1 are displayed sequentially as indicated by arrows, these steps are not necessarily executed sequentially in the sequence indicated by the arrows. Unless otherwise explicitly specified in this specification, execution of the steps is not strictly limited, and the steps may be performed in other sequences. Moreover, at least part of the steps in FIG. 1 may include a plurality of sub-steps or a plurality of stages, these sub-steps or stages are not necessarily completed at the same moment, but may be executed at different moments, and these sub-steps or stages are not necessarily sequentially executed, but may be executed alternatively with other steps or at least part of sub-steps or stages in other steps.

Embodiment 2

A virtual network performance acceleration method includes: step S1, whether an OVS invokes a CT mechanism is monitored; step S2, a translation rule is triggered in a case of detecting that the OVS invokes the CT mechanism; and step S3, a translation message translated by the translation rule is translated. The translation rule includes: obtaining header information of a first message that has been processed by the CT mechanism, a universal unique identifier and header information of a second message that needs to be processed by the CT mechanism; and translating the header information of the second message based on the header information of the first message and the universal unique identifier.

Specifically, the translation rule is triggered in a case of determining that it is monitored that the OVS invokes the CT mechanism.

In the embodiment, translation of the header information of the second message includes: an information correspondence table is generated based on the header information of the first message and the universal unique identifier; a data structure corresponding to the universal unique identifier is determined based on the information correspondence table; and based on the data structure, a translation message is generated by replacing the header information of the second message.

In the embodiment, the step of generating the information correspondence table includes: the header information of the first message that has been processed by the CT mechanism is obtained; the header information of the first message is stored in a form of a data structure, and the universal unique identifier corresponding to each data structure is determined; and the information correspondence table is generated based on the data structure and the universal unique identifier.

In the embodiment, the header information at least includes: a network address translation type, an IP address, port information and a link type, and replacement of the header information of the second message depends on a network translation type in the header information of the second message.

In the embodiment, the method includes: step S0, whether to turn on virtual network performance acceleration is judged, and step S1 is executed in a case of confirming that the virtual network performance acceleration is turned on; step S1 is not executed in a case of confirming that the virtual network performance acceleration is not turned on; and step S2 further includes: the translation rule is not triggered in a case of not monitoring that the OVS invokes the CT mechanism.

Specifically, step S1 is executed in a case of determining whether to turn on the virtual network performance acceleration and confirming that the virtual network performance acceleration is turned on. Step S1 is not executed in a case of determining whether to turn on the virtual network performance acceleration and confirming that the virtual network performance acceleration is not turned on. The translation rule is not triggered in a case of determining that it is not monitored that the OVS invokes the CT mechanism.

In the embodiment, the header information of the second message after being replaced is stored in a form of a second data structure; and the information correspondence table is updated based on the second data structure and a corresponding universal unique identifier thereof.

In the embodiment, updating the information correspondence table includes: the information correspondence table is traversed, and a coincidence degree between the header information of the second message and the header information of each first message is judged; and in a case that the coincidence degree between the header information of the second message and the header information of each first message is lower than a first threshold, the second data structure and the corresponding universal unique identifier thereof are stored into the information correspondence table to update the information correspondence table. Those skilled in the art can reasonably choose a value of the first threshold according to actual situations. In a specific embodiment, the first threshold is 95%.

Specifically, the coincidence degree between the header information of the second message and the header information of each first message is recognized. In the case of determining that the coincidence degree between the header information of the second message and the header information of each first message is lower than the first threshold, the second data structure and the corresponding universal unique identifier thereof are stored into the information correspondence table to update the information correspondence table.

The embodiment of the present application has the following beneficial effects:
1. A control module described in the present application is configured to turn on or turn off the virtual network performance acceleration according to users own needs, which helps to improve the user experience and also avoids the waste of performance resources.
2. The translation rule described in the present application can realize beneficial effects of optimizing processing logic. By optimizing the processing logic, a forwarding rate of the messages is further improved, a forwarding delay is reduced, and the network performance is improved, that is, the virtual network performance of the OVS is greatly improved without increasing hardware costs.
3. The virtual network performance acceleration method described in the present application realizes bypassing the long and complex CT processing flows originally designed for general purposes in the Linux kernel through the generated translation rule, reduces a processing path, and improves the network performance. Compared with the forwarding performance of the original OVS, the forwarding performance has been greatly improved, which can be improved by 40%-60%, while the forwarding delay can be reduced by 30%.
4. The virtual network performance acceleration method described in the present application fully utilizes broadband resources of a data center network link without upgrading hardware, providing users with excellent user experience.

Embodiment 3

Figure 3:
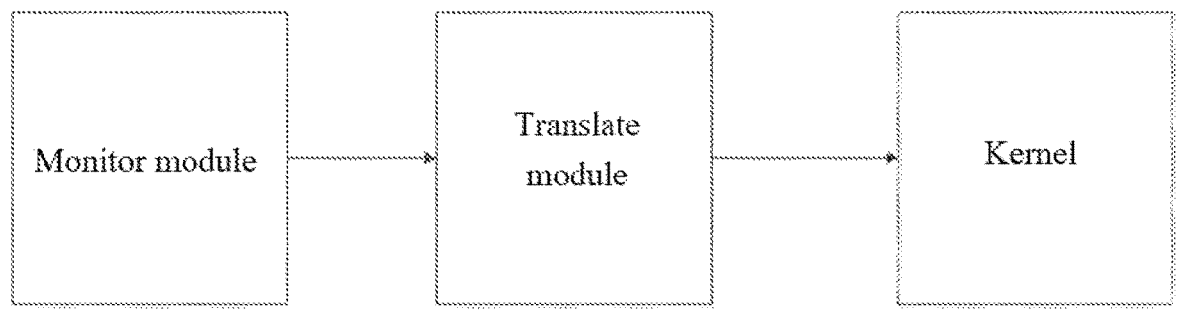
FIG. 3 shows a structural block diagram of a virtual network performance acceleration apparatus described in one or more embodiments of the present application.

A virtual network performance acceleration apparatus, as shown in FIG. 3, includes: a monitor module, configured to monitor whether an OVS invokes a CT mechanism; a translating module, configured to carry out translation of header information according to a preset translation rule to generate a translation message, wherein the translation rule includes: obtaining header information of a first message that has been processed by the CT mechanism, a universal unique identifier and header information of a second message that needs to be processed by the CT mechanism; generating an information correspondence table based on the header information of the first message and the universal unique identifier; determining a data structure corresponding to the universal unique identifier according to the information correspondence table; and generating, based on the data structure, the translation message by replacing the header information of the second message; and a kernel, configured to receive the translation message and forward the translation message.

In one embodiment, the virtual network performance acceleration apparatus may further include: a control module, configured to turn on or turn off an acceleration function of the virtual network performance acceleration apparatus; a monitor module, configured to monitor whether an OVS invokes a CT mechanism; a translating module, configured to carry out translation of header information according to a preset translation rule to generate a translation message; and a kernel, configured to receive the translation message and forward the translation message. The translation rule includes: obtaining header information of a first message that has been processed by the CT mechanism, a universal unique identifier and header information of a second message that needs to be processed by the CT mechanism; generating an information correspondence table based on the header information of the first message and the universal unique identifier; determining a data structure corresponding to the universal unique identifier according to the information correspondence table; and generating, based on the data structure, the translation message by replacing the header information of the second message.

In the embodiment, the step of generating the information correspondence table includes: the header information of the first message that has been processed by the CT mechanism is obtained; the header information of the first message is stored in a form of a data structure, and the universal unique identifier corresponding to each data structure is determined; and the information correspondence table is generated based on the data structure and the universal unique identifier. The header information at least includes: a network address translation type, an IP address, port information and a link type.

Various technical features of the above embodiments can be combined arbitrarily. To make the description concise, all possible combinations of each technical feature in the above embodiments have not been described. However, as long as there is no contradiction in the combinations of these technical features, they should be considered within the scope of this specification. It should be understood that the modules included in the virtual network performance acceleration apparatus may include the above functional modules, but are not limited to the above functional modules. Those skilled in the art can combine and design the above modules according to actual scene requirements, and can also choose other modules and units that can realize the above functions.

Those skilled in the art may understand that, the structure shown in FIG. 3 is only a block diagram of a partial structure related to a solution in the present application, and does not constitute a limitation to the virtual network performance acceleration apparatus to which the solution in the present application is applied. Specifically, a computer device may include components more or fewer than those shown in the figure, or may combine some components, or may have a different component deployment.

Embodiment 4

Figure 4:
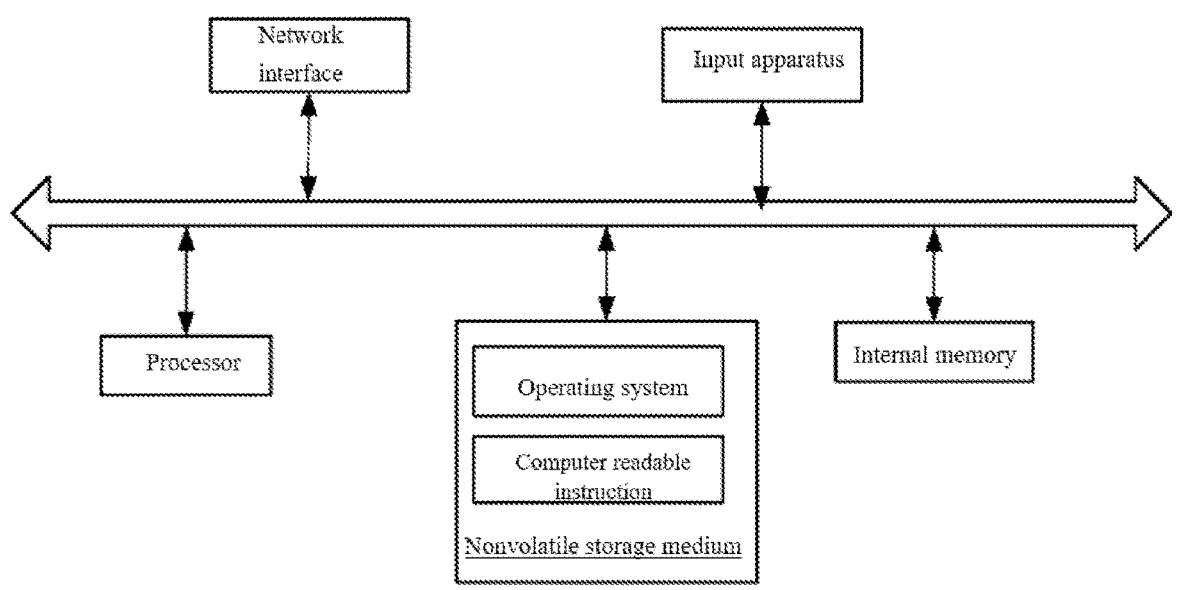
FIG. 4 is a schematic structural diagram of a computer device provided by one or more embodiments of the present application.

In some embodiments, a virtual network performance acceleration device is provided, and an internal structural diagram of the virtual network performance acceleration device may be shown in FIG. 4. The virtual network performance acceleration device includes a processor, a memory, a network interface and an input apparatus which are connected through a system bus. The processor is configured to provide computing and control capabilities. The memory includes a nonvolatile storage medium and an internal memory. The nonvolatile storage medium stores an operating system and a computer readable instruction. The internal memory provides an environment for the operation of the operating system and the computer readable instruction in the nonvolatile storage medium. The network interface of the virtual network performance acceleration device is configured to communicate with an external terminal or server through a network connection. The computer readable instructions, when executed by the processor, implement a virtual network performance acceleration method. The input apparatus may be a touch layer covered on a display screen, a key, a trackball or a touch pad arranged on a computer device shell, or an external keyboard, a touch pad, a mouse or the like.

Those skilled in the art may understand that, the structure shown in FIG. 4 is only a block diagram of a partial structure related to a solution in the present application, and does not constitute a limitation to the device to which the solution in the present application is applied. Specifically, the device may include components more or fewer than those shown in the figure, or may combine some components, or may have a different component deployment.

It should be understood that the memory of the virtual network performance acceleration device includes the nonvolatile storage medium and the internal memory. Those skilled in the art may understand that, the above virtual network performance acceleration device is only a partial structure related to the solution in the present application, and does not constitute a limitation to the virtual network performance acceleration device to which the solution in the present application is applied. Specifically, the virtual network performance acceleration device may include components more or fewer than those shown in the above device structure, or may combine some components, or may have different components.

Embodiment 5

Figure 5:
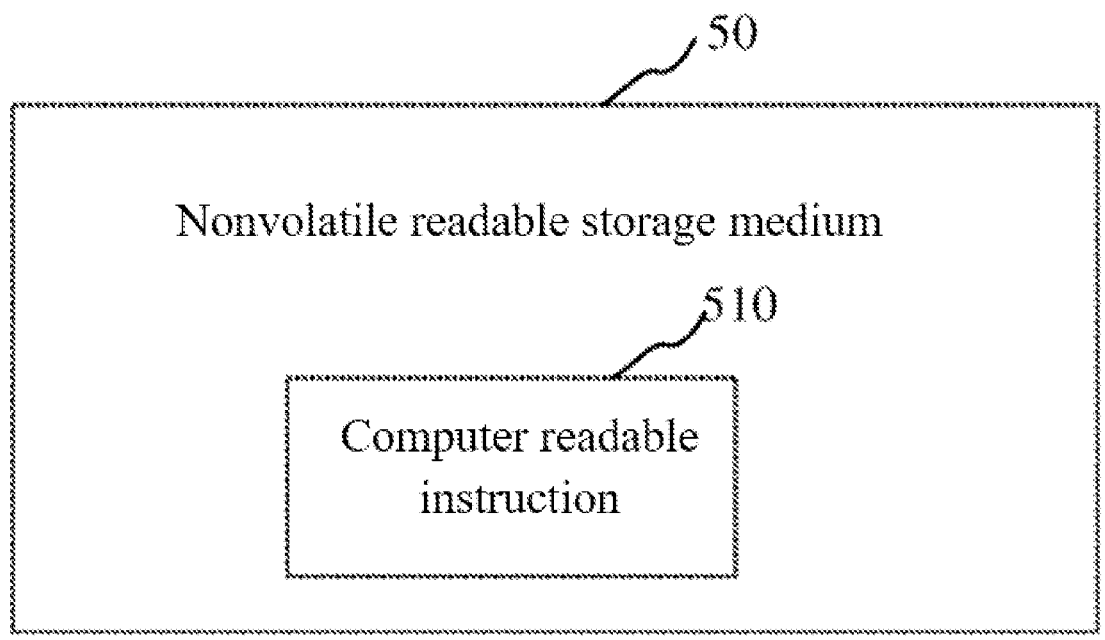
FIG. 5 is a schematic structural diagram of one embodiment of a computer readable storage medium provided by one or more embodiments of the present application.

Based on the same inventive concept, according to another aspect of the present application, as shown in FIG. 5, an embodiment of the present application further provides a nonvolatile readable storage medium 50, the nonvolatile readable storage medium 50 has computer readable instructions 510 stored therein, and the computer readable instructions 510, when executed by one or more processors, implement steps of the virtual network performance acceleration method in any one of the above embodiments.

Those of ordinary skill in the art may understand that all or some of flows in the methods of the above embodiments may be implemented by instructing relevant hardware through the computer readable instructions. The computer readable instructions may be stored in a nonvolatile computer readable storage medium. The computer readable instructions, when executed, may include the flows of the embodiments of the methods above. Any reference to memory, storage, database or other media used in each embodiment provided by the present application may include a nonvolatile and/or volatile memory. The nonvolatile memory may include a read only memory (ROM), a programmable ROM (PROM), an electrically programmable ROM (EPROM), an electrically erasable programmable ROM (EEPROM) or a flash memory. The volatile memory may include a random access memory (RAM) or an external cache memory. As an explanation rather than limitation, RAM is available in various forms, such as a static RAM (SRAM), a dynamic RAM (DRAM), a synchronous DRAM (SDRAM), a dual data rate SDRAM (DDRSDRAM), an enhanced SDRAM (ESDRAM), a synchlink DRAM (SLDRAM), a rambus direct RAM (RDRAM), a direct memory bus dynamic RAM (DRDRAM), and a memory bus dynamic RAM (RDRAM).

Although preferred embodiments in the embodiments of the present application have been described, those skilled in the art can make additional changes and modifications to these embodiments once they know the basic creative concept. So the appended claims are intended to be construed to include the preferred embodiments and all changes and modifications that fall within the scope of the embodiments of the present application.

Apparently, those skilled in the art can make various modifications and variations to the present application without departing from the spirit and scope of the present application. In this way, under the condition that these modifications and variations of the present application fall within the scope of the claims of the present application and their equivalent art, the present application is also intended to include these modifications and variations.

What is claimed is:

1. A virtual network performance acceleration method, comprising:
   step S1, monitoring whether an OVS invokes a CT mechanism;
   step S2, triggering a translation rule in a case of detecting that the OVS invokes the CT mechanism; and
   step S3, forwarding a translation message translated by the translation rule;
   wherein the translation rule comprises:
      obtaining header information of a first message that has been processed by the CT mechanism, a universal unique identifier and header information of a second message that needs to be processed by the CT mechanism; and
      translating the header information of the second message based on the header information of the first message and the universal unique identifier;
   wherein translation of the header information of the second message comprises:
      generating an information correspondence table based on the header information of the first message and the universal unique identifier;
      determining a data structure corresponding to the universal unique identifier according to the information correspondence table; and
      generating, based on the data structure, the translation message by replacing the header information of the second message;
   wherein the step of generating the information correspondence table comprises:
      obtaining the header information of the first message that has been processed by the CT mechanism;
      storing the header information of the first message in a form of data structure, and determining a universal unique identifier corresponding to each data structure; and
      generating the information correspondence table based on the data structure and the corresponding universal unique identifier;
   wherein the header information of the second message after being replaced is stored in a form of a second data structure; and the information correspondence table is updated based on the second data structure and a corresponding universal unique identifier thereof;
   wherein updating the information correspondence table comprises:
      traversing the information correspondence table, and recognizing a coincidence degree between the header information of the second message and the header information of each first message; and
      storing, in a case that the coincidence degree between the header information of the second message and the header information of any first message is lower than a first threshold, the second data structure and the corresponding universal unique identifier thereof into the information correspondence table to update the information correspondence table.

2. The virtual network performance acceleration method of claim 1, wherein the header information at least comprises a network address translation type, an IP address, port information and a link type, and replacement of the header information of the second message depends on a network address translation type in the header information of the second message.

3. The virtual network performance acceleration method of claim 1, comprising: step S0, executing step S1 in a case of turning on virtual network performance acceleration and confirming that the virtual network performance acceleration is turned on; not executing step S1 in a case of confirming that the virtual network performance acceleration is not turned on; and
   the step S2 further comprises: not triggering the translation rule in a case of not detecting that the OVS invokes the CT mechanism.

4. A virtual network performance acceleration device, comprising a memory and one or more processors, wherein the memory has computer readable instructions stored therein, and the computer readable instructions, when executed by the one or more processors, enable the one or more processors to execute steps of a virtual network performance acceleration method, and the steps comprise:
   step S1, monitoring whether an OVS invokes a CT mechanism;
   step S2, triggering a translation rule in a case of detecting that the OVS invokes the CT mechanism; and
   step S3, forwarding a translation message translated by the translation rule;
   wherein the translation rule comprises:

obtaining header information of a first message that has been processed by the CT mechanism, a universal unique identifier and header information of a second message that needs to be processed by the CT mechanism; and translating the header information of the second message based on the header information of the first message and the universal unique identifier;

wherein translation of the header information of the second message comprises:

generating an information correspondence table based on the header information of the first message and the universal unique identifier;

determining a data structure corresponding to the universal unique identifier according to the information correspondence table; and generating, based on the data structure, the translation message by replacing the header information of the second message;

wherein the step of generating the information correspondence table comprises:

obtaining the header information of the first message that has been processed by the CT mechanism;

storing the header information of the first message in a form of data structure, and determining a universal unique identifier corresponding to each data structure; and generating the information correspondence table based on the data structure and the corresponding universal unique identifier;

wherein the header information of the second message after being replaced is stored in a form of a second data structure; and the information correspondence table is updated based on the second data structure and a corresponding universal unique identifier thereof;

wherein updating the information correspondence table comprises:

traversing the information correspondence table, and recognizing a coincidence degree between the header information of the second message and the header information of each first message; and storing, in a case that the coincidence degree between the header information of the second message and the header information of any first message is lower than a first threshold, the second data structure and the corresponding universal unique identifier thereof into the information correspondence table to update the information correspondence table.

5. The virtual network performance acceleration device of claim 4, wherein the header information at least comprises a network address translation type, an IP address, port information and a link type, and replacement of the header information of the second message depends on a network address translation type in the header information of the second message.

6. The virtual network performance acceleration device of claim 4, comprising: step S0, executing step S1 in a case of turning on virtual network performance acceleration and confirming that the virtual network performance acceleration is turned on; not executing step S1 in a case of confirming that the virtual network performance acceleration is not turned on; and the step S2 further comprises: not triggering the translation rule in a case of not detecting that the OVS invokes the CT mechanism.

7. A non-transitory computer readable storage media, having computer readable instructions stored therein, wherein the computer readable instructions, when executed by one or more processors, enable the one or more processors to execute steps of a virtual network performance acceleration method, and the steps comprise:

step S1, monitoring whether an OVS invokes a CT mechanism;

step S2, triggering a translation rule in a case of detecting that the OVS invokes the CT mechanism; and step S3, forwarding a translation message translated by the translation rule;

wherein the translation rule comprises:

obtaining header information of a first message that has been processed by the CT mechanism, a universal unique identifier and header information of a second message that needs to be processed by the CT mechanism; and translating the header information of the second message based on the header information of the first message and the universal unique identifier;

wherein translation of the header information of the second message comprises:

generating an information correspondence table based on the header information of the first message and the universal unique identifier; determining a data structure corresponding to the universal unique identifier according to the information correspondence table; and generating, based on the data structure, the translation message by replacing the header information of the second message;

wherein the step of generating the information correspondence table comprises:

obtaining the header information of the first message that has been processed by the CT mechanism; storing the header information of the first message in a form of data structure, and determining a universal unique identifier corresponding to each data structure; and generating the information correspondence table based on the data structure and the corresponding universal unique identifier;

wherein the header information of the second message after being replaced is stored in a form of a second data structure; and the information correspondence table is updated based on the second data structure and a corresponding universal unique identifier thereof;

wherein updating the information correspondence table comprises:

traversing the information correspondence table, and recognizing a coincidence degree between the header information of the second message and the header information of each first message; and storing, in a case that the coincidence degree between the header information of the second message and the header information of any first message is lower than a first threshold, the second data structure and the corresponding universal unique identifier thereof into the information correspondence table to update the information correspondence table.

8. The non-transitory computer readable storage media of claim 7, wherein the header information at least comprises a network address translation type, an IP address, port information and a link type, and replacement of the header information of the second message depends on a network address translation type in the header information of the second message.

9. The non-transitory computer readable storage media of claim 7, comprising: step S0, executing step S1 in a case of turning on virtual network performance acceleration and confirming that the virtual network performance acceleration is turned on; not executing step S1 in a case of confirming that the virtual network performance acceleration is not turned on; and the step S2 further comprises: not triggering the translation rule in a case of not detecting that the OVS invokes the CT mechanism.

\* \* \* \* \*